(12) United States Patent
Wheaton et al.

(10) Patent No.: US 10,060,355 B2
(45) Date of Patent: Aug. 28, 2018

(54) RUPTURE CONSTRAINT MECHANISM

(71) Applicant: THE BOEING COMPANY, Chicago, IL (US)

(72) Inventors: Christopher Wheaton, Mukilteo, WA (US); Mark Stephen Shander, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 545 days.

(21) Appl. No.: 14/617,640

(22) Filed: Feb. 9, 2015

(65) Prior Publication Data
US 2016/0230670 A1    Aug. 11, 2016

(51) Int. Cl.
*F02C 7/24* (2006.01)
*F02C 7/32* (2006.01)
*F01D 25/00* (2006.01)
*F02C 7/00* (2006.01)
*F16L 57/00* (2006.01)
*B64D 13/00* (2006.01)

(52) U.S. Cl.
CPC ............... *F02C 7/24* (2013.01); *F01D 25/00* (2013.01); *F02C 7/00* (2013.01); *F02C 7/32* (2013.01); *F16L 57/00* (2013.01); *B64D 13/00* (2013.01); *F05D 2300/2102* (2013.01); *F05D 2300/614* (2013.01); *Y02T 50/672* (2013.01)

(58) Field of Classification Search
CPC ...... F02C 7/24; F02C 7/00; F02C 7/32; F16L 57/00; F01D 25/00; Y02T 50/672; F05D 2300/614; F05D 2300/2102; B64D 13/00
See application file for complete search history.

(56) References Cited

U.S. PATENT DOCUMENTS

| | | | | |
|---|---|---|---|---|
| 2,766,614 A | * | 10/1956 | Cook | F16L 23/167 174/151 |
| 3,557,384 A | * | 1/1971 | Barron et al. | F41H 1/02 2/2.5 |
| 4,668,202 A | * | 5/1987 | Scheurer | B63C 9/115 441/112 |
| 4,956,218 A | * | 9/1990 | Haining | A62C 8/06 169/50 |
| 5,651,711 A | * | 7/1997 | Samano | B63C 9/20 116/173 |

(Continued)

*Primary Examiner* — Valentina Xavier
(74) *Attorney, Agent, or Firm* — Patterson + Sheridan, LLP

(57) ABSTRACT

Apparatus and system for containing a rupture of a duct. The apparatus includes an air-permeable sheet, such as a wide-weave fiberglass sheet. The air-permeable sheet includes a strap arranged on a first side of the sheet such that it forms diamond-shaped patterns along a longitudinal axis. The strap can be made of a tight-weave fiberglass. Laterally-spaced corners of the diamond-shaped patterns include connection members that can be engaged to affix the strap and the air-permeable sheet around a duct. Various aspects include an air-impermeable air barrier surrounding the wide-weave fiberglass sheet and strap. The air barrier can include a window that directs air from a ruptured duct. Various aspects can be used on a bleed-air duct of an aircraft. The window of the air barrier can be aimed at a temperature sensor. A valve can close the bleed-air duct if the temperature sensor detects a high temperature leak.

18 Claims, 6 Drawing Sheets

(56) References Cited

U.S. PATENT DOCUMENTS

| | | | | |
|---|---|---|---|---|
| 6,092,525 | A * | 7/2000 | Church | A61F 5/05883 128/869 |
| 8,567,064 | B1 * | 10/2013 | Wright | F16L 31/00 285/260 |
| 2007/0197945 | A1 * | 8/2007 | Islava | A61F 5/0193 602/24 |
| 2012/0090176 | A1 * | 4/2012 | Stancel | H02S 20/00 29/890.033 |
| 2012/0118882 | A1 * | 5/2012 | Holland | B65D 88/127 220/1.5 |
| 2013/0245520 | A1 * | 9/2013 | Munaretto | A61F 5/0102 602/6 |
| 2013/0263963 | A1 * | 10/2013 | Kalman | B32B 1/08 138/153 |
| 2015/0351458 | A1 * | 12/2015 | Fisher | A41B 7/02 2/270 |
| 2016/0256340 | A1 * | 9/2016 | Williams | A61G 7/001 |
| 2016/0265702 | A1 * | 9/2016 | Strasik | F16L 57/00 |
| 2017/0100660 | A1 * | 4/2017 | Campbell | A63B 71/1225 |
| 2017/0199012 | A1 * | 7/2017 | Mulcahey | F41H 5/08 |
| 2017/0234029 | A1 * | 8/2017 | Walter | E04H 15/54 135/147 |

* cited by examiner

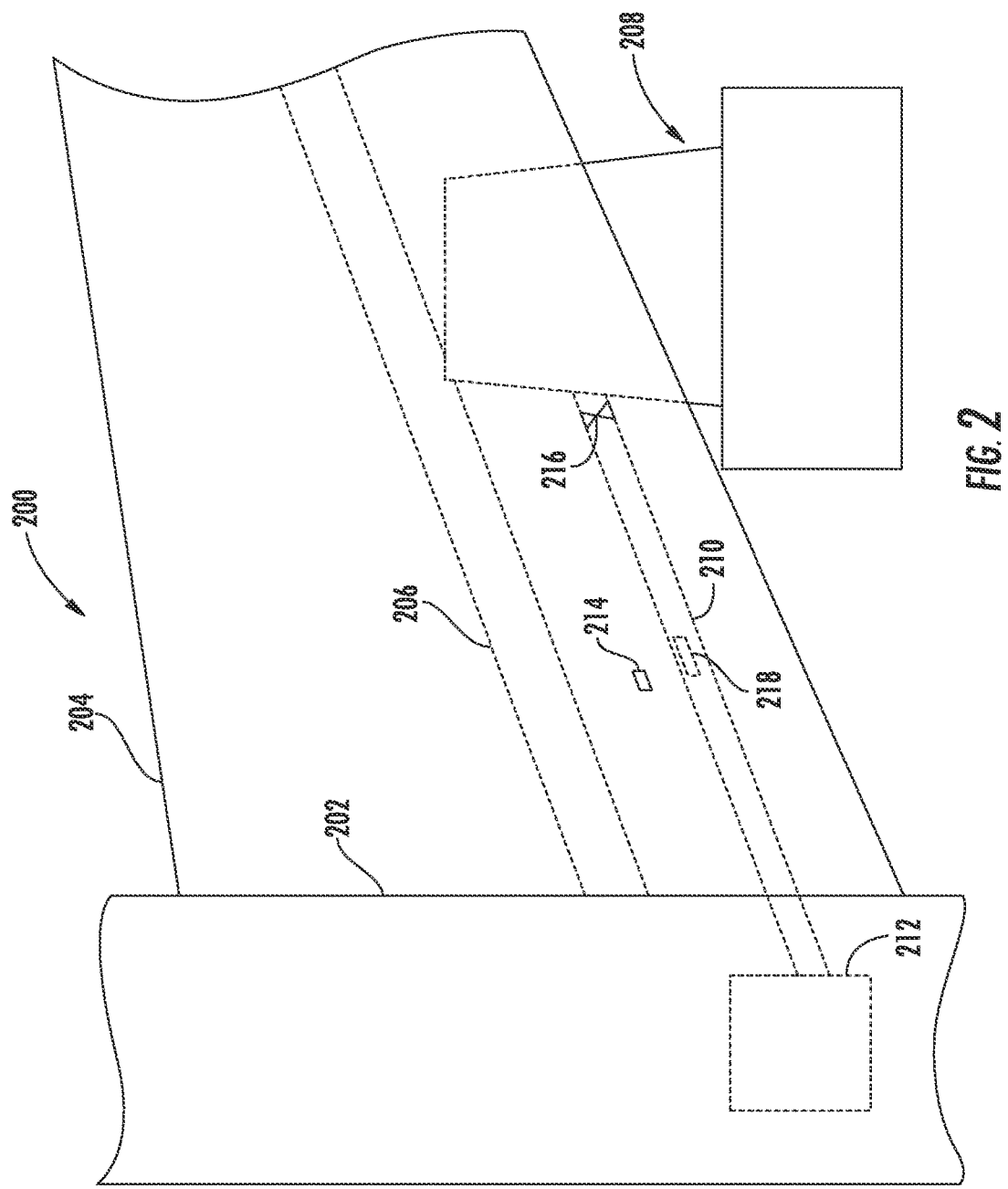

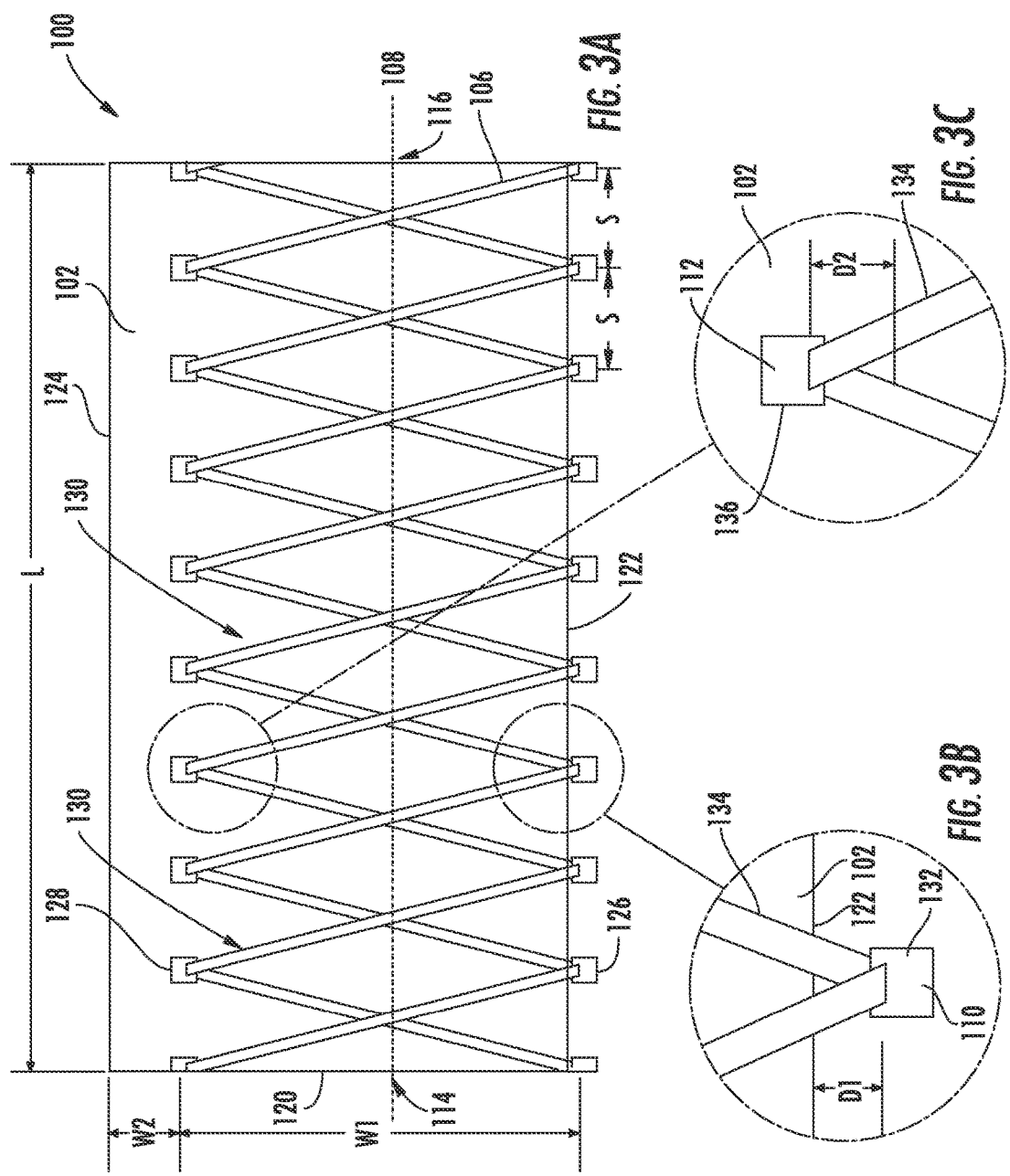

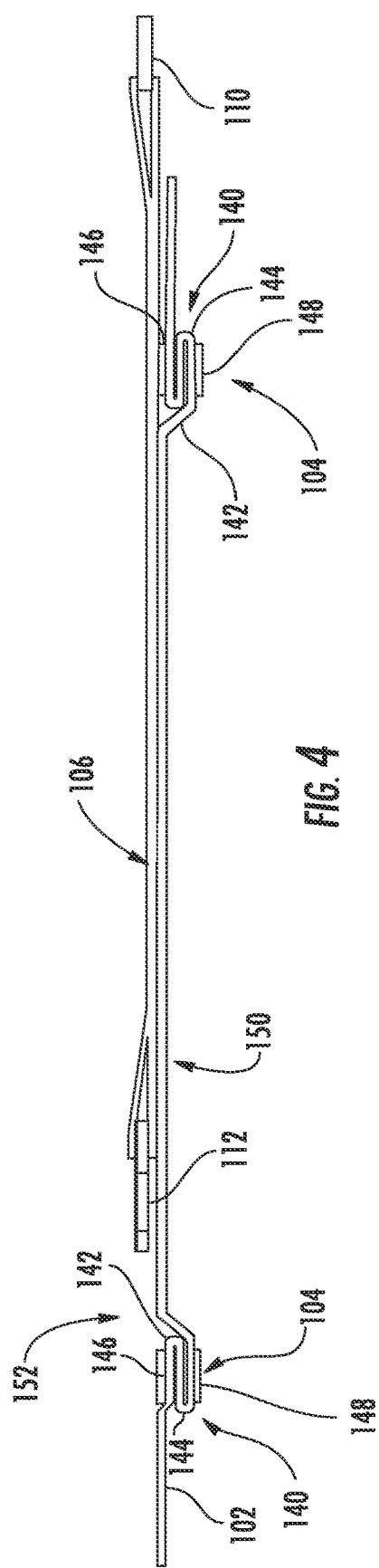
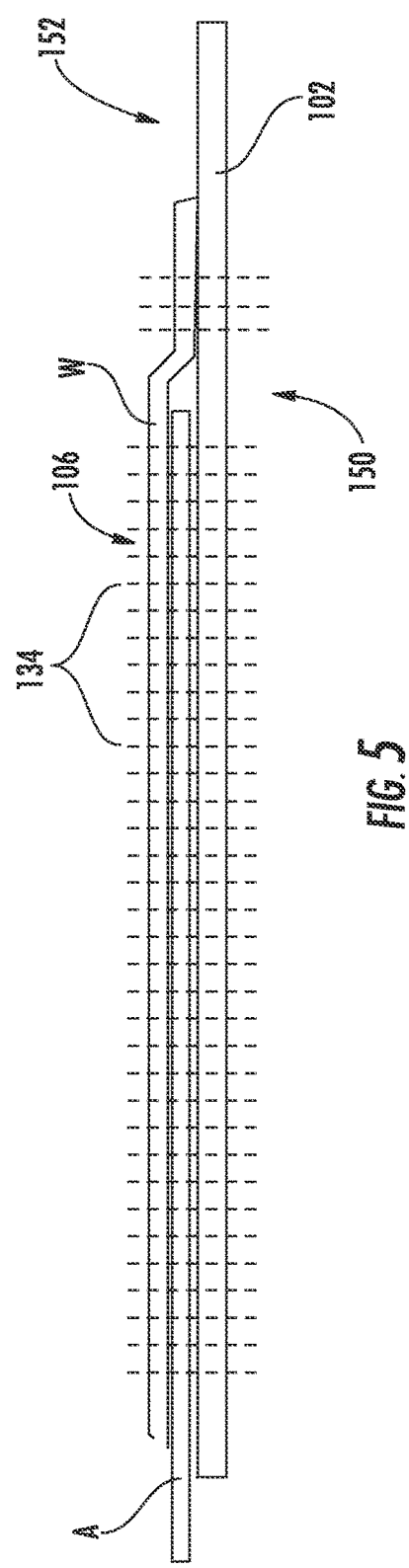

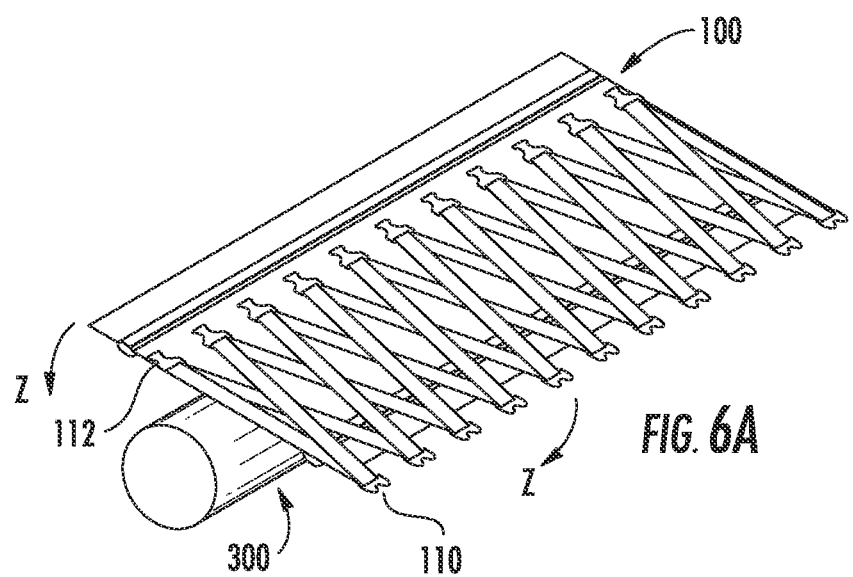

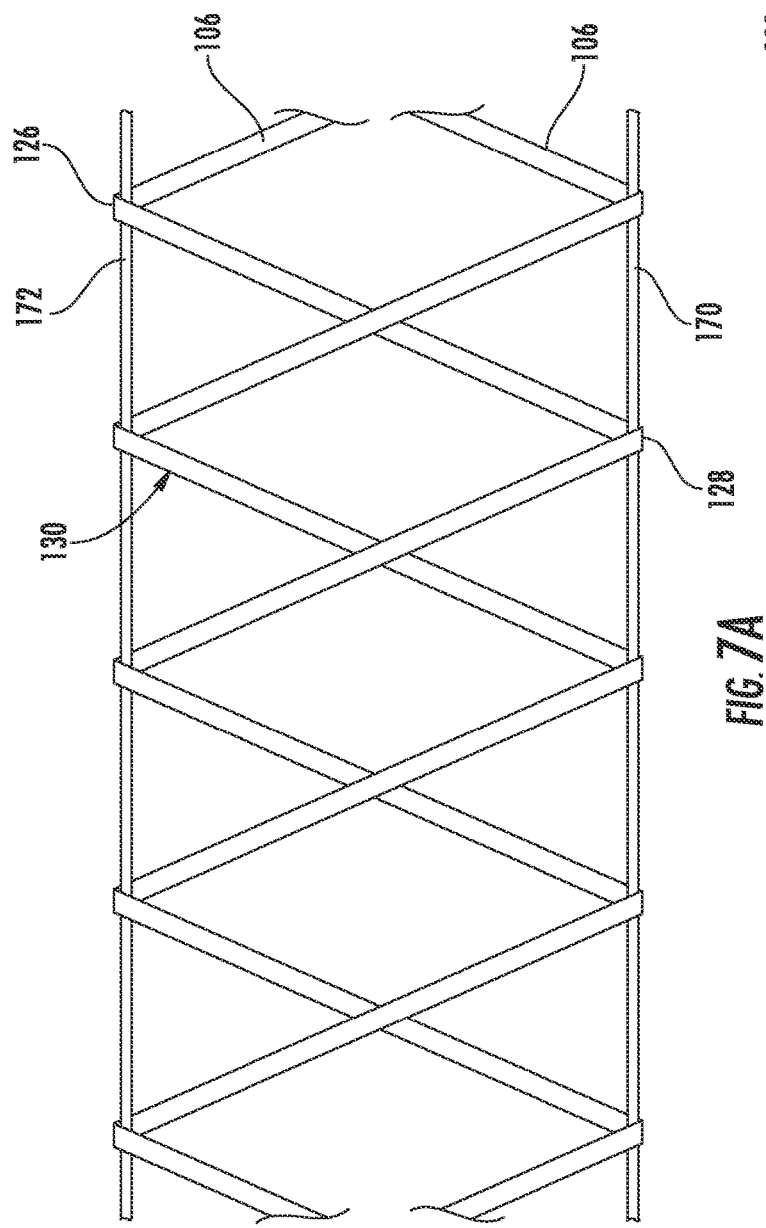
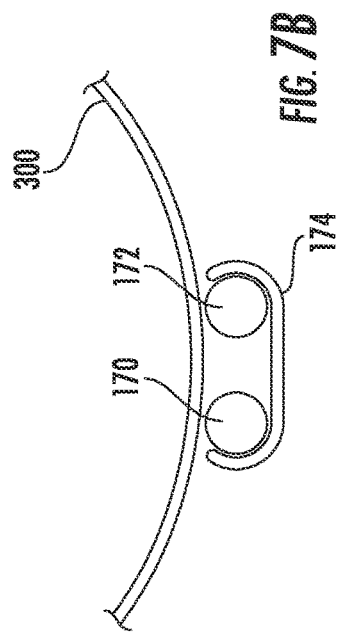

RUPTURE CONSTRAINT MECHANISM

BACKGROUND

The present application relates to a rupture constraint mechanism, and more specifically, to a rupture constraint mechanism for a high-temperature environment.

SUMMARY

According to an aspect, an apparatus includes a sheet that includes a first side and a second opposing side. The apparatus also includes a strap arranged on the first side of the air-permeable sheet. The strap comprises a tight weave material. The strap includes a first plurality of connection members and a second plurality of connection members arranged along the strap such that the first plurality of connection members can couple to respective ones of the second plurality of connection members when the sheet is disposed on a pressurized gas vessel.

According to an aspect, an apparatus includes an air-permeable fiberglass sheet that includes a first side and a second opposing side. The air-permeable fiberglass sheet defines a longitudinal axis. The apparatus also includes a strap arranged on the first side of the air-permeable fiberglass sheet. The strap comprises tight-weave fiberglass. The strap extends along the longitudinal axis from a start point on the longitudinal axis to an end point on the longitudinal axis. The strap criss-crosses the longitudinal axis to form a plurality of diamond-shaped patterns on the first side of the air-permeable fiberglass sheet. Opposing laterally-spaced corners of each diamond-shaped pattern are located a lateral width away from the longitudinal axis. The apparatus also includes first connection members attached to the strap at respective first laterally-spaced corners of the diamond-shaped pattern on a first side of the longitudinal axis. The apparatus also includes second connection members attached to the strap at respective second laterally-spaced corners of the diamond-shaped pattern on a second side of the longitudinal axis. The second connection members are configured to be coupled to the first connection members to strap the air-permeable fiberglass sheet around a duct.

According to an aspect, a method for isolating a pressurized gas vessel includes arranging a sheet around a pressure vessel. The sheet includes a strap arranged on an outward-facing side of the sheet. The strap comprises a tight weave material. The strap includes a first plurality of connection members and a second plurality of connection members arranged along the strap. The method also includes connecting respective ones of the first plurality of connection members to respective ones of the second plurality of connection members.

According to an aspect, a method includes arranging a strap on a first side of a sheet. The strap includes a first plurality of connection members and a second plurality of connection members arranged on the strap such that the first plurality of connection members can couple to respective ones of the second plurality of connection members when the sheet is disposed on a pressurized gas vessel. The method also includes attaching the arranged strap to the sheet.

According to an aspect, a system for isolating a duct includes a rupture constraint mechanism. The rupture constraint mechanism includes an air-permeable fiberglass sheet that includes a first side and a second opposing side. The air-permeable fiberglass sheet defines a longitudinal axis. The rupture constraint mechanism also includes a strap arranged on the first side of the air-permeable fiberglass sheet. The strap comprises tight-weave fiberglass. The strap extends along the longitudinal axis from a start point on the longitudinal axis to an end point on the longitudinal axis. The strap criss-crosses the longitudinal axis to form a plurality of diamond-shaped patterns on the first side of the air-permeable fiberglass sheet. Opposing laterally-spaced corners of each diamond-shaped pattern are located a lateral width away from the longitudinal axis. The rupture constraint mechanism also includes first connection members attached to the strap at respective first laterally-spaced corners of the diamond-shaped pattern on a first side of the longitudinal axis. The rupture constraint mechanism also include second connection members attached to the strap at respective second laterally-spaced corners of the diamond-shaped pattern on a second side of the longitudinal axis. The second connection members are configured to be coupled to the first connection members to strap the air-permeable fiberglass sheet around a duct. The system also includes an air barrier that wraps around the ballistic sheet on the duct. The air barrier includes an insulation blanket. The air barrier also includes a fastener mechanism that fastens a first edge of the insulation blanket relative to a second opposing edge of the insulation blanket around the duct.

According to an aspect, an aircraft includes a wing that includes at least one of a composite skin and a composite wing spar. The aircraft also includes a gas turbine engine attached to the wing and a bleed air duct from the gas turbine engine passing through the wing. The aircraft also includes a removable rupture constraint mechanism wrapped around at least a portion of the bleed air duct. The removable rupture constraint mechanism includes an air-permeable fiberglass sheet that includes a first side and a second opposing side. The air-permeable fiberglass sheet defines a longitudinal axis. The rupture constraint mechanism also includes a strap arranged on the first side of the air-permeable fiberglass sheet. The strap comprises tight-weave fiberglass. The strap extends along the longitudinal axis from a start point on the longitudinal axis to an end point on the longitudinal axis. The strap criss-crosses the longitudinal axis to form a plurality of diamond-shaped patterns on the first side of the air-permeable fiberglass sheet. Opposing laterally-spaced corners of each diamond-shaped pattern are located a lateral width away from the longitudinal axis. The rupture constraint mechanism also includes first connection members attached to the strap at respective first laterally-spaced corners of the diamond-shaped pattern on a first side of the longitudinal axis. The rupture constraint mechanism also includes second connection members attached to the strap at respective second laterally-spaced corners of the diamond-shaped pattern on a second side of the longitudinal axis. The second connection members are coupled to the first connection members to strap the air-permeable fiberglass sheet around the bleed air duct. The aircraft also includes an air barrier wrapped around the ballistic sheet on the duct. The air barrier includes an insulation blanket. The air barrier also includes a fastener mechanism that fastens a first edge of the insulation blanket relative to a second opposing edge of the insulation blanket around the bleed air duct.

BRIEF DESCRIPTION OF THE SEVERAL VIEWS OF THE DRAWINGS

FIG. 2 is a partial top view of an aircraft, wherein certain interior features of the aircraft are shown in dashed line;

FIG. 3A is a top view of the rupture constraint mechanism of FIG. 1A according to various aspects, wherein the wrap is laid flat, and wherein weave arresting strips are omitted for clarity;

FIG. 3B is a top detail view of a portion of a laterally-spaced corner of a diamond-shaped pattern on the rupture constraint mechanism of FIG. 3A, wherein a connection member is shown;

FIG. 3C is a top detail view of a portion of a laterally-spaced corner of a diamond-shaped pattern on the rupture constraint mechanism of FIG. 3A, wherein a connection member is shown;

FIG. 4 is a side view of the rupture constraint mechanism of FIG. 1A, wherein the wrap is laid flat;

FIG. 5 is a detail schematic side view of a portion of the rupture constraint mechanism of FIG. 1A, wherein ends of a strap overlap and are sewn to a mat and to each other;

FIG. 6A is a perspective view of the rupture constraint mechanism of FIG. 1A arranged to be wrapped around a duct;

FIG. 7A is a top view of a strap arrangement for a rupture constraint mechanism according to various aspects; and FIG. 7B is a side view of the strap arrangement of FIG. 7A with fasteners included.

DETAILED DESCRIPTION

Figure 1A:
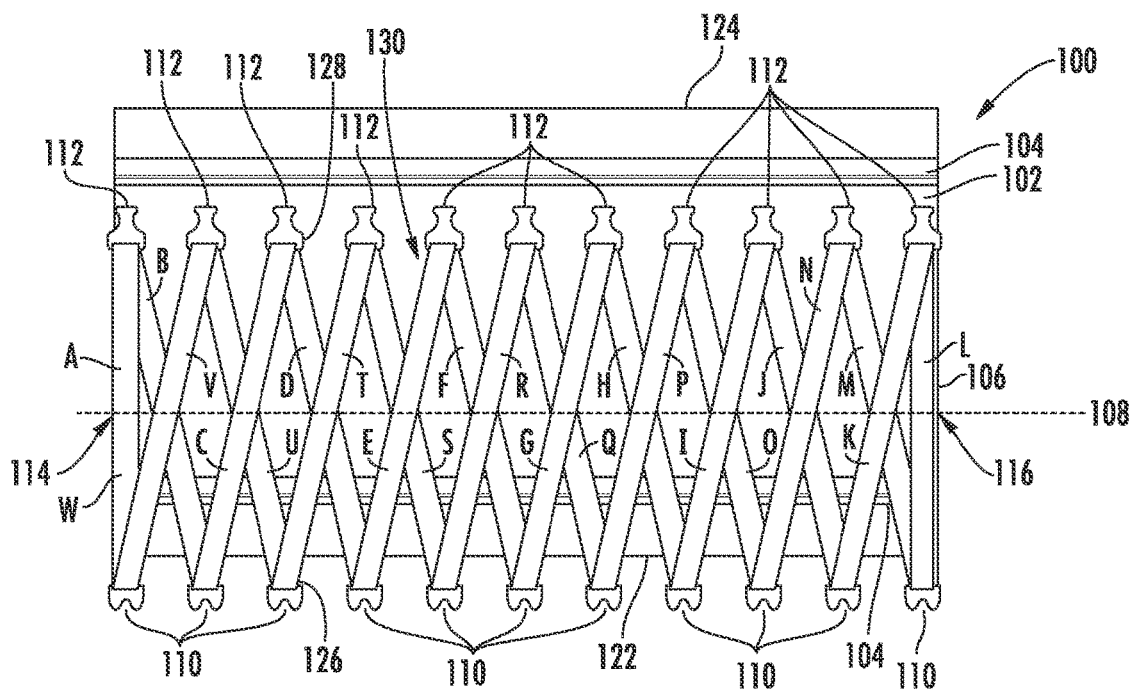
FIG. 1A is a top view of a rupture constraint mechanism according to various aspects, wherein the wrap is laid flat.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In various applications, ducts transport high-temperature and/or high-pressure gas. Occasionally, such ducts suffer failures, and gas escaping from the rupture can damage structures around the ducts. FIG. 2 illustrates an example of a high-temperature, high-pressure duct in an aircraft 200. FIG. 2 depicts a portion of a fuselage 202 and a wing 204 of the aircraft 200. The wing 204 includes structural members, such as a spar 206. The skin of the wing and/or structural members, such as the spar 206, can be made from a composite material, such as carbon fiber reinforced plastic (CFRP). The aircraft 200 is powered by a gas turbine engine 208 that is suspended from the wing 204. A bleed air duct 210 transports high-temperature, high-pressure air bled from the gas turbine engine 208 to one or more pneumatic systems 212 (e.g., a pneumatic generator, an Environmental Conditioning System, or the like), which uses the air from the bleed air duct 210 to operate various systems onboard the aircraft 200. In the event the bleed air duct 210 ruptures, escaping high-temperature, high-pressure air could damage the composite spar 206, the composite wing skin, and/or other composite structures within the wing 204.

To mitigate problems associated with a duct rupture, the bleed air duct 210 can include an air barrier wrapped there around. The air barrier may include a fabric, such as a silicone-infused fabric, wrap that is substantially air impermeable and that can withstand the high temperature of the bleed air. In low temperature operations, the air barrier could be a plastic sheet or other substantially air impermeable material. The air barrier can include a gap, a seam, a window, or the like through which air escaping from a duct rupture can be directed. However, a rupture of the bleed air duct 210 could damage the air barrier, causing hot bleed air to escape from the bleed air duct 210 through a compromised portion of the air barrier. Such escaping bleed air could impinge on the composite structures in the wing 204, causing damage.

In various aspects described herein, an air-permeable rupture constraint mechanism is applied around a duct, such as the bleed air duct 210, which can absorb kinetic energy from a rupture of the duct. A substantially impermeable air barrier that can direct air escaping from the rupture can surround the rupture constraint mechanism. The rupture constraint mechanism and the air barrier are removable from the duct, enabling periodic inspections of the duct. The air-permeable rupture constraint mechanism can prevent the rupturing duct from compromising the air barrier. In various aspects, a temperature sensor can be arranged near a window or other gap in the air barrier. In the event of a duct failure, high temperature gas will escape through the window and impinge on the temperature sensor, causing an increase in an indicated temperature. The increased indicated temperature can cause a valve to be closed to stop gas flow through the ruptured duct.

Figure 1B:
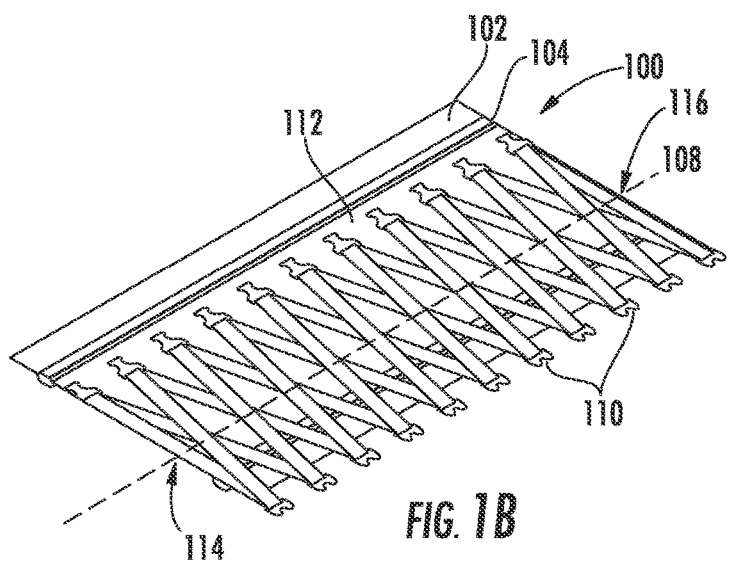
FIG. 1B is a perspective view of the rupture constraint mechanism of FIG. 1A.

FIGS. 1A and 1B illustrate a rupture constraint mechanism 100 according to various aspects. The rupture constraint mechanism 100 includes an air-permeable sheet 102. For example, the air-permeable sheet 102 may comprise a wide-weave fiberglass, such as Owens Corning® wide weave fiberglass. The air-permeable sheet 102 may be generally rectangular in shape. In various instances, the air-permeable sheet 102 may have a shape other than rectangular (e.g., a circular shape or an oval shape). For purposes of explanation, an axis 108 is shown on the air-permeable sheet 102. The wide weave fiberglass may be loosely woven, giving the fabric properties that diminish the ability to retain stitches in the event of a rupture. To address the reduced holding strength of a stitch in a wide-weave fabric in the event of a rupture, the rupture constraint mechanism 100 can include a strap 106 (e.g., a tight-weave strap) attached to the air-permeable sheet 102. The strap 106 can be arranged in a crisscross manner over the axis 108 that results in a diamond-shaped pattern 130 on the air-permeable sheet 102. In various instances, the strap could be made from a high-strength fiberglass, such as S-glass fiberglass.

The high-strength fiberglass strap can have a tighter weave than the air permeable fiberglass that comprises the air-permeable sheet 102. As a result, the strap 106 may not be air permeable, but the diamond-shaped pattern 130 provides spacing between portions of the strap 106 through which air from a ruptured pipe can escape. The strap 106 can be attached to the air-permeable sheet 102 in any variety of ways, including by permanent or releasable means. For example, the strap 106 could be attached to the air-permeable sheet 102 using tape or glue. In one aspect, the high-strength fiberglass of the strap 106 can hold a stitch, so that the strap 106 can be sewn to the air-permeable sheet 102. The stitches, described in greater detail below, or other attachment means enable the air-permeable sheet 102 to be positioned relative to the strap 106. Laterally-spaced corners 126 and 128 of each diamond-shaped pattern 130 can include connection members 110 and 112, respectively. The connection members 110 and 112 may comprise male and female connection members, respectively, that mate together to connect a first laterally-spaced corner 126 to an opposing second laterally-spaced corner 128. For example, the connection members 110 and 112 could include female buckle member and male buckle members, respectively. In various instances, the connection members may be made of plastic. In various other embodiments, the connection members may be made of a metal, such as a steel alloy, an aluminum alloy, brass, or the like. An example of the connection members is the GT COBRA® connector made by AustriAlpin and ITW Nexus North America.

Figure 6B:
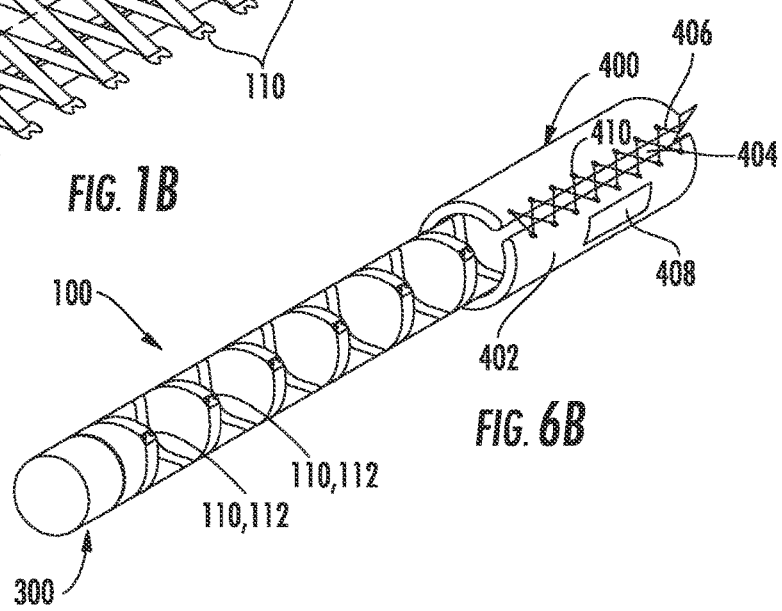
FIG. 6B is a partial perspective view of the rupture constraint mechanism of FIG. 1A wrapped around the duct, and wherein an air barrier is shown in partial cross-section wrapped around the duct and the rupture constraint mechanism.

Referring to FIG. 6A, the rupture constraint mechanism 100 can be placed over a duct 300 (e.g., the bleed air duct 210 of the aircraft 200, shown in FIG. 2). The rupture constraint mechanism 100 can then be wrapped around the duct 300 as indicated by arrows Z. Referring to FIG. 6B, as the rupture constraint mechanism 100 is wrapped around the duct 300, the connection members 110 and 112 can be engaged to secure the rupture constraint mechanism 100 around the duct 300. FIG. 6B also shows a partial cutaway of an air barrier 400 (also referred to as an insulation blanket) surrounding the rupture constraint mechanism 100. The air barrier 400 includes a substantially air-impermeable mat 402 (e.g., made of a silicone-infused fabric), that can contain and direct air that escapes from the duct 300. The air barrier 400 may be secured around the rupture constraint mechanism 100 with a fastener mechanism, such as laces 406, passing through apertures 410 arranged along opposing edges of the substantially air-impermeable mat 402. The air barrier 400 may include an outlet to direct escaping air in a particular direction. For example, the air barrier 400 may include a window 408 or aperture through which air from the ruptured duct 300 can escape. As another example, the air barrier 400 may include a gap 404 between the opposing edges of the substantially air-impermeable mat 402. Air escaping from the ruptured duct 300 could pass through the gap 404.

Referring to FIGS. 1A-1B, 3A-3C, and 5, as discussed above, the strap 106 is arranged on the air-permeable sheet 102 in a diamond-shaped pattern 130, and the strap 106 can be sewn to the air-permeable sheet 102. For example, S-Glass fiberglass can be used as stitches 134. In various embodiments, the strap 106 can comprise a single, continuous piece of strap material. Referring to FIG. 1A, at a starting location 114 along the axis 108, a section "A" of the strap 106 can be laid out perpendicular to the axis 108. A male connection member 112 can be placed on the strap. For example, referring to FIG. 3C, the male connection member 112 could include a slot 136 through which the strap 106 can be fitted. After the male connection member 112 is placed on the strap 106, the strap 106 can be folded over to form section "B" at an angle relative to section "A." For example, section "B" may be arranged at an angle between around 10° and 20° relative to section "A." As another example, section "B" may be arranged at an angle of around 15° relative to section "A." A female connection member 110 can be placed on the strap 106. For example, referring to FIG. 3B, the female connection member 110 could include a slot 132 through which the strap 106 can be fitted. After the female connection member 110 is placed on the strap 106, the strap 106 can be folded over at an angle to form section "C" relative to section "B." The angle between sections "B" and "C" can be double the angle between sections "A" and "B." For example, the angle between sections "B" and "C" may be between around 20° and 40°. As another example, the angle between sections "B" and "C" may be around 30°. A female connection member 110 can be placed on the strap 106, and the strap 106 can be folded over to form section "D." Section "D" can be arranged relative to section "C" at the same angle as the angle between sections "B" and "C." The strap 106 can continue to be laid out by forming sections "E," "F," "G," "H," "I," "J," and "K" in a similar manner to sections "B" and "C," described above. Female and male connection members 110 and 112, respectively, can be alternately placed between each section. After section "K" is formed, the strap has reached an ending location 116 on the axis 108. At the ending location 116, a male connection member 112 can be placed on the strap 106, and the strap 106 can be folded at an angle to form section "L" perpendicular to the axis 108. The angle between sections "K" and "L" may be the same as the angle between sections "A" and "B."

After section "L" is formed, a female connection member 110 can be placed on the strap 106, and the strap can be folded at an angle to form section "M." The angle between sections "L" and "M" can be the same as the angle between sections "K" and "L." After section "M," a male connection member 112 can be placed on the strap 106, and the strap 106 can be folded over at an angle to form section "N." The angle between sections "M" and "N" can be the same as the angle between sections "B" and "C," discussed above. After section "N" is formed, a female connection member 110 can be placed on the strap 106, and the strap 106 can be folded at an angle to form section "O." The angle between sections "N" and "O" can be the same as the angle between sections "M" and "N." The strap 106 can continue to be laid out by forming sections "P," "Q," "R," "S," "T," "U," and "V" in a similar manner to sections "M" and "N" and sections "N" and "O" described above. Female and male connection members 110 and 112, respectively, can be alternately placed between each section. After section "V," the strap has returned to the starting location 114 on the axis 108. At the starting location 114, a female connection member 110 can be placed on the strap 106, and the strap 106 can be folded at an angle to form section "W" perpendicular to the axis 108. The angle between sections "V" and "W" can be the same as the angle between sections "A" and "B," discussed above. As shown from the side in FIG. 5, at least a portion of section "W" of the strap 106 overlaps with at least a portion of section "A" of the strap 106.

The strap 106, when laid out as described above, forms diamond-shaped patterns 130 along the axis 108. Female connection members 110 are located at first laterally-spaced corners 126 of the diamond-shaped patterns 130 and male connection members 112 are located at second laterally-spaced corners 128 of the diamond-shaped patterns 130. In various aspects, both male connection members 112 and female connection members 110 can be located on laterally-spaced corners on a first side of the longitudinal axis so long as the opposite connection member type is located at opposing laterally-spaced corners. For example, the connection member between sections "C" and "D" in FIG. 1A could be a female connection member 110 so long as the connection member between sections "T" and "U" is a male connection member 112. Referring to FIGS. 3A-3C, the sections "A" through "W" of the strap 106 can be sewn to the air-permeable sheet 102 (e.g., using stitches of S-glass fiberglass thread). The stitches 134 can extend along the length of each section, except for a portion at the laterally-spaced corners 126, 128. For example, referring to FIG. 3B, in various aspects, the axis 108 can be arranged relative to the air-permeable sheet 102 such that the first laterally-spaced corners 126 and the female connection members 110 extend past an edge 122 of the air-permeable sheet 102. In that case, the stitches 134 can extend close to the edge 122 of the air-permeable sheet 102. A portion of the strap 106 at the laterally-spaced corner having a lateral dimension D1 does not have stitching 134. The lack of stitching proximate to the laterally-spaced corner 126 provides freedom of movement for the female connection member 110 located at the laterally-spaced corner 126, enabling the female connection members 110 to be manipulated for connection to corresponding male connection members 112. Referring now to FIG. 3C, the axis 108 can be arranged relative to the air-permeable sheet 102 such that the second laterally-spaced corners 128 and the male connection members 112 are located over the air-permeable sheet 102. In such aspects, the stitches 134 can extend to a lateral dimension D2 of the second lateral corner 128. The lack of stitching proximate to the laterally-spaced corner 128 provides freedom of movement for the male connection member 112 located at the laterally-spaced corner 128, enabling the male connection member 112 to be manipulated for connection to a corresponding female connection member 110.

Referring to FIG. 5, as discussed above, sections "A" and "W" of the strap 106 overlap. Stitching 134 can be sewn through sections "A" and "W" of the strap 106 and through the air-permeable sheet 102. The stitching 134 can anchor sections "A" and "W" to the air-permeable sheet 102 and also connect sections "A" and "W" of the strap 106 together.

In various aspects, the strap 106 may include several separate sections of strap material that are sewn together. For example, referring to FIG. 1A, a first portion of the strap 106 may include sections "A," "B," and "V." A second portion of the strap 106 may include sections "B" and "C." A third portion of the strap 106 may include sections "V" and "U." The first portion of the strap 106 can be placed on the air-permeable sheet 102 and sewn in place. The second portion of the strap 106 can be placed on the air-permeable sheet 102 such that section "B" of the second portion overlaps with section "B" of the first portion. Then, the two "B" sections can be sewn to the air-permeable sheet 102 and to each other. Similarly, the third portion of the strap 106 can be placed on the air-permeable sheet 102 such that section "V" of the third portion overlaps with section "V" of the first portion. Then, the two "V" sections can be sewn to the air-permeable sheet 102 and to each other. Additional portions can be laid on the air-permeable sheet 102 and sewn together in a similar manner.

Referring again to FIGS. 3A-3C, in one aspect, the air-permeable sheet 102 has a length L of 72 inches and a width of about 27.5 inches. The axis 108 is offset from a centerline of the air-permeable sheet 102 by about 5 inches and a width W1 of the diamond-shaped patterns 130 is about 21.5 inches. As a result, the first laterally-spaced corners 126 of the diamond-shaped patterns 130 extend about 2 inches past the edge 122 of the air-permeable sheet 102. The dimension D1 of the portion of the diamond-shaped patterns 130 at the laterally-spaced corners 126 without stitching 134 can be slightly greater than about 2 inches. Also, the second laterally-spaced corners 128 of the diamond-shaped patterns 130 are located an inboard distance W2 of 8 inches. The dimension D2 portion of the diamond-shaped patterns 130 at the laterally-spaced corners 128 without stitching 134 can be approximately 2 inches. A spacing S between adjacent laterally-spaced corners 126 or 128 can be approximately 8 inches. The strap 106 can have a width of approximately 1.5 inches.

Referring to FIGS. 1A, 1B, and 4, the air-permeable sheet 102 can include one or more weave arresting strips 104. In various aspects, the weave arresting strips 104 are aligned with the axis 108. As shown in FIG. 4, each weave arresting strip 104 includes a pleat 140. The pleat 140 is formed by creating a first fold 144 and a second fold 142 in the air-permeable sheet 102. The first fold 144 and the second fold 142 can be substantially parallel to the axis 108. A first strip of tape 146 (e.g., S-glass fiberglass tape) is applied to a pleat 140 on a first side 152 of the air-permeable sheet 102 and a second strip of tape 148 is applied to the pleat on a second side 150 of the air-permeable sheet 102. The first strip of tape 146 and the second strip of tape 148 can be sewn to the pleat 140 (e.g., with S-glass fiberglass stitches). Similar to the strap 106, the first strip of tape 146 and the second strip of tape 148 make the weave arresting strips 104 less air-permeable than remaining portions of the air-permeable sheet 102. However, the weave arresting strips 104 are localized features, and any air that escapes from a rupture of a duct can flow around the weave arresting strips 104. In the event of a rupture of a duct, the air-permeable sheet 102 at the location of the rupture may tear or rip. Momentum of the rupturing duct material and/or air flowing out of the duct may cause individual strands of the air-permeable sheet 102 to unravel. The weave arresting strips 104 can provide extra strand retention to the air-permeable sheet 102, which may stop such strands from unraveling further Although the weave arresting strips 104 shown in the figures are aligned with the axis 108, they can also be aligned in other directions, such as perpendicular to the axis 108 or at another angle.

FIGS. 7A and 7B illustrate another aspect of the strap 106 for an air permeable mat. In this aspect, the connection members are replaced by connection rods 170 and 172. A first connection rod 170 is passed through the strap 106 at first laterally-spaced corners 128 of the diamond-shaped patterns 130 where the strap 106 folds back on itself. A second connection rod is passed through the strap 106 at second laterally-spaced corners 126 of the diamond-shaped pattern where the strap 106 folds back on itself. As shown in FIG. 7B, when the strap 106 is wrapped around a duct 300, the connection rods 170 and 172 are arranged close together. In some aspects, the connection rods 170 and 172 may be spaced apart. In various other aspects, the connection rods 170 and 172 may be touching. Connection clips 174 can be attached to the connection rods 170 and 172 to secure the connection rods 170 and 172 together and retain the strap 106 around the duct 300. In other aspects, a combination of different connection means is used.

As discussed above, in various aspects, the axis 108 of the strap 106 can be offset from a centerline of the air-permeable sheet 102. Referring again to FIG. 3A, such an offset can form a width W2 of the air-permeable sheet 102 to the side of the strap 106. The width W2 of the air-permeable sheet 102 may ease installation of the rupture constraint mechanism 100 around a duct 300. For example, the rupture constraint mechanism 100 shown in FIG. 1A could be arranged on the duct 300 such that the male connection members 112 are positioned at the top of the duct 300. The width W2 of air permeable mat 100 could be draped over one side of the duct 300, wherein gravity will pull the width W2 into contact with the duct 300. The female connection members 110 can be pulled around an opposite side of the high pressure duct to engage the male connection members 112. The width W2 laying flat on the duct 300 can ensure that the air-permeable sheet 102 lays flat against the duct 300 rather than bunching up while the connection members 110 and 112 are being engaged. Also, the width W2 of the air-permeable sheet 102 provides an overlapping portion of the rupture constraint mechanism 100 that ensures that no gap exists in the air-permeable sheet 102. For example, in the example shown in FIG. 3A, the edges 122 and 124 of the may overlap by an amount equal to W2–D1.

Referring again to FIG. 2, in use in an aircraft 200, the rupture constraint mechanism (e.g., rupture constraint mechanism 100) can protect an air barrier (e.g., the air barrier 400 shown in FIG. 6B) from damage caused by a rupture in a bleed air duct 210. The air barrier can include a window 218 that is oriented toward a temperature sensor 214. As discussed above, in various aspects, the window 218 could be an opening in the air barrier (e.g., the substantially air-impermeable mat 402 shown in FIG. 6B). In various aspects, the window 218 could be an air-permeable section in the air barrier (e.g., the substantially air-impermeable mat 402). In the event of a rupture of the bleed air duct 210, escaping air can pass through the air permeable mat of the rupture constraint mechanism and through the window 218 in the air barrier. The escaping bleed air, which is hot, will cause the temperature sensor 214 to sense an elevated temperature. If the sensed temperature exceeds a threshold temperature, a valve 216 between the bleed air duct 210 and the gas turbine engine 208 can be closed to stop air flow through the bleed air duct 210. In various aspects, the event of the sensed temperature exceeding a threshold temperature could illuminate a warning light in the flight deck of the aircraft, and a pilot may take steps to close the valve. For example, a pilot may operate one or more switches in the flight deck to close the valve 216. In various other aspects, a computer onboard the aircraft 200 may automatically close the valve 216 in the event the sensed temperature exceeds a threshold temperature. By closing the valve 216, the composite structures of the wing 204 may be saved from damage caused by high-temperature air escaping from a ruptured bleed air duct 210.

The rupture constraint mechanism 100 described above can be easily removed and reinstalled from a duct to facilitate periodic maintenance and inspection of the duct or to facilitate inspection related to a fault indication. For example, referring to the aircraft 200 of FIG. 2, the aircraft may provide pilots or maintenance personnel with a low pneumatic pressure warning. In such an instance, a flight may be delayed until the cause of the low pneumatic pressure (e.g., a leak) is found and fixed. Maintenance personnel can quickly remove the rupture constraint mechanism 100 by removing the air barrier and then undoing the connection members 110 and 112. After the high pressure duct 210 has been inspected, the rupture constraint mechanism 100 can be quickly reinstalled.

In the aspects described above, the diamond-shaped patterns 130 of the strap 106 provide circumferential support for the air-permeable sheet 102 as well as longitudinal support for the air-permeable sheet 102. Put differently, the strap 106 holds the air-permeable sheet 102 around a duct and provides support in the event of a duct rupture. The diamond-shaped patterns 130 in the strap 106 interconnect the longitudinally spaced-apart connection members 110 and 112. In the event of a duct rupture that may cause a tear in the air-permeable sheet 102, the longitudinal interconnections between connection members 110 and 112 by the diamond-shaped patterns 130 can prevent the torn-apart sections of the air-permeable sheet 102 from moving apart from each other in the longitudinal direction and the circumferential direction along the duct. This application contemplates other aspects that secure an air-permeable mat around a duct and that also provide longitudinal stability and integrity. For example, a strap (e.g., strap 106) could be arranged in other patterns, such as a checkered pattern, a circular net pattern, or any other interconnected pattern.

The descriptions of the various aspects herein have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. An apparatus, comprising:
   a sheet that includes a first side and a second opposing side; and
   a strap arranged on the first side of the sheet, the strap comprising a first weave material, the strap including a first plurality of connection members and a second plurality of connection members arranged along the strap such that the first plurality of connection members can couple to respective ones of the second plurality of connection members when the sheet is disposed on a pressurized gas vessel, the strap extending along an axis on the sheet from a start point to an end point and criss-crossing the axis to form a plurality of diamond-shaped patterns on the first side of the sheet, wherein opposing laterally-spaced corners of each diamond pattern are located a lateral width away from the axis, the strap folding over at the laterally-spaced corners, the first plurality of connection members attached to the strap at respective folds at the first laterally-spaced corners, and the second plurality of connection members attached to the strap at respective folds at the second laterally-spaced corners.

2. The apparatus of claim 1, wherein the strap comprises an S-glass fiberglass.

3. An apparatus, comprising:
   a sheet that includes a first side and a second opposing side, wherein the sheet comprises an air-permeable weave fiberglass, wherein the air-permeable sheet comprises a weave arresting strip, wherein the weave arresting strip comprises:
      a pleat formed in the air-permeable sheet;
      a first strip of tape arranged on a first side of the pleat;
      a second strip of tape arranged on a second side of the pleat; and
      stitching that engages the pleat, the first strip of tape, and the second strip of tape; and
   a strap arranged on the first side of the sheet, wherein the strap comprises a first weave material, and wherein the strap includes a first plurality of connection members and a second plurality of connection members arranged along the strap such that the first plurality of connection members can couple to respective ones of the second plurality of connection members when the sheet is disposed on a pressurized gas vessel.

4. The apparatus of claim 1, wherein the strap is sewn to the air-permeable sheet with stitches.

5. The apparatus of claim 1, wherein the first plurality of connection members comprise a plurality of male buckle members, wherein the second plurality of connection members comprise a plurality of female buckle members, and wherein the plurality of male buckle members engage respective ones of the plurality of female buckle members to couple the first connection members to the second connection members.

6. The apparatus of claim 5, wherein the plurality of male buckle members disengage the respective ones of the plurality of female buckle members to decouple the first connection members from the second connection members.

7. An apparatus, comprising:
a sheet that includes a first side and a second opposing side; and
a strap arranged on the first side of the sheet, the strap comprising:
a first weave material;
a first plurality of connection members and a second plurality of connection members arranged along the strap such that the first plurality of connection members can couple to respective ones of the second plurality of connection members when the sheet is disposed on a pressurized gas vessel, and wherein the first plurality of connection members comprise a first connection rod engaged with at least two first laterally-spaced corners, wherein the second plurality of connection members comprise a second connection rod engaged with at least second laterally-spaced corners; and
at least one connection clip configured to attach to the first connection rod and the second connection rod.

8. A system for isolating a duct, the system comprising:
a rupture constraint mechanism comprising:
an air-permeable fiberglass sheet that includes a first side and a second opposing side, the air-permeable fiberglass sheet defining a longitudinal axis;
a strap arranged on the first side of the air-permeable fiberglass sheet, the strap comprising weaved fiberglass, the strap extending along the longitudinal axis from a start point on the longitudinal axis to an end point on the longitudinal axis, the strap criss-crossing the longitudinal axis to form a plurality of diamond-shaped patterns on the first side of the air-permeable fiberglass sheet, wherein opposing laterally-spaced corners of each diamond-shaped pattern are located a lateral width away from the longitudinal axis;
first connection members attached to the strap at respective first laterally-spaced corners of the diamond-shaped pattern on a first side of the longitudinal axis; and
second connection members attached to the strap at respective second laterally-spaced corners of the diamond-shaped pattern on a second side of the longitudinal axis, the second connection members configured to be coupled to the first connection members to strap the air-permeable fiberglass sheet around a duct; and
an air barrier that wraps around the rupture constraint mechanism on the duct, the air barrier comprising:
an insulation blanket; and
a fastener mechanism that fastens a first edge of the insulation blanket relative to a second opposing edge of the insulation blanket around the duct.

9. The system of claim 8, wherein the strap folds over at the laterally-spaced corners, wherein the first connection members are attached to the strap at respective folds at the first laterally-spaced corners, and wherein the second connection members are attached to the strap at respective folds at the second laterally-spaced corners.

10. The system of claim 8, wherein the air-permeable fiberglass sheet comprises a second weave fiberglass, wherein the weave fiberglass of the strap is tighter than the weave of the air-permeable fiberglass sheet.

11. The system of claim 8, wherein the strap comprises an S-glass fiberglass.

12. The system of claim 8, wherein the air-permeable fiberglass sheet comprises a weave arresting strip, wherein the weave arresting strip comprises:
a pleat formed in the air-permeable fiberglass sheet;
a first strip of fiberglass tape arranged on a first side of the pleat;
a second strip of fiberglass tape arranged on a second side of the pleat; and
fiberglass stitching engaging the pleat, the first strip of fiberglass tape, and the second strip of fiberglass tape.

13. The system of claim 8, wherein the strap is sewn to the air-permeable fiberglass sheet with fiberglass stitches.

14. The system of claim 8, wherein the first connection members comprise a plurality of male buckle members, wherein the second connection members comprise a plurality of female buckle members, and wherein the plurality of male buckle members engage respective ones of the plurality of female buckle members to couple the first connection members to the second connection members.

15. The system of claim 8, wherein the first connection members comprise a first connection rod engaged with at least two of the first laterally-spaced corners, wherein the second connection members comprise a second connection rod engaged with at least two of the second laterally-spaced corners; and
further comprising at least one connection clip configured to attach to the first connection rod and the second connection rod.

16. An aircraft, comprising:
a wing that includes at least one of a composite skin and a composite wing spar;
a gas turbine engine attached to the wing;
a bleed air duct from the gas turbine engine passing through the wing;
a removable rupture constraint mechanism wrapped around at least a portion of the bleed air duct, the removable rupture constraint mechanism comprising:
an air-permeable fiberglass sheet that includes a first side and a second opposing side, the air-permeable fiberglass sheet defining a longitudinal axis;
a strap arranged on the first side of the air-permeable fiberglass sheet, the strap comprising weaved fiberglass, the strap extending along the longitudinal axis from a start point on the longitudinal axis to an end point on the longitudinal axis, the strap criss-crossing the longitudinal axis to form a plurality of diamond-shaped patterns on the first side of the air-permeable fiberglass sheet, wherein opposing laterally-spaced corners of each diamond-shaped pattern are located a lateral width away from the longitudinal axis;

first connection members attached to the strap at respective first laterally-spaced corners of the diamond-shaped pattern on a first side of the longitudinal axis; and second connection members attached to the strap at respective second laterally-spaced corners of the diamond-shaped pattern on a second side of the longitudinal axis, the second connection members coupled to the first connection members to strap the air-permeable fiberglass sheet around the bleed air duct; and an air barrier wrapped around the rupture constraint mechanism on the duct, the air barrier comprising:

an insulation blanket; and a fastener mechanism that fastens a first edge of the insulation blanket relative to a second opposing edge of the insulation blanket around the bleed air duct.

17. The aircraft of claim 16, further comprising a temperature sensor, wherein the air barrier defines a gap between the first edge of the insulation blanket and the second opposing edge of the insulation blanket, and wherein the air barrier is wrapped around the ballistic sheet and the duct such that the gap is oriented toward the temperature sensor.

18. The aircraft of claim 17, further comprising a valve arranged between the gas turbine engine and the bleed air duct, wherein the valve is configured to automatically close in the event that the temperature sensor indicates a temperature above a threshold temperature.

* * * * *